United States Patent
Cho et al.

(10) Patent No.: US 7,952,254 B2
(45) Date of Patent: May 31, 2011

(54) STATOR OF OUTER ROTOR TYPE MOTOR

(75) Inventors: Hung Myong Cho, Gimhae-si (KR);
Min Kyu Lim, Jinhae-si (KR)

(73) Assignee: LG Electronics Inc., Seoul (KR)

( * ) Notice: Subject to any disclaimer, the term of this patent is extended or adjusted under 35 U.S.C. 154(b) by 261 days.

(21) Appl. No.: 12/301,341

(22) PCT Filed: May 22, 2006

(86) PCT No.: PCT/KR2006/001906
§ 371 (c)(1),
(2), (4) Date: Nov. 18, 2008

(87) PCT Pub. No.: WO2007/136145
PCT Pub. Date: Nov. 29, 2007

(65) Prior Publication Data
US 2009/0230812 A1 Sep. 17, 2009

(30) Foreign Application Priority Data

May 19, 2006 (KR) .......................... 10-2006-0045096

(51) Int. Cl.
*H02K 1/06* (2006.01)
(52) U.S. Cl. ... 310/216.118; 310/216.001; 310/216.041; 310/216.042; 310/216.043; 310/216.044; 310/216.046; 310/216.047
(58) Field of Classification Search ........... 310/216.041, 310/216.118, 216.001, 216.042, 216.043, 310/216.044, 16.046, 216.047; *H02K 1/06*
See application file for complete search history.

(56) References Cited

U.S. PATENT DOCUMENTS

| 3,225,424 | A |   | 12/1965 | Wiley |
|---|---|---|---|---|
| 3,270,231 | A |   | 8/1966 | Wiley |
| 3,577,351 | A | * | 5/1971 | Dethridge ............... 252/301.4 R |
| 3,842,493 | A | * | 10/1974 | Ohuchi et al. ................... 29/596 |
| 3,886,256 | A | * | 5/1975 | Ohuchi et al. ......... 310/216.069 |
| 4,202,196 | A | * | 5/1980 | Asai et al. ........................ 72/137 |
| 4,206,621 | A |   | 6/1980 | Kawasaki et al. |
| 4,613,780 | A | * | 9/1986 | Fritzsche ............... 310/216.043 |
| 4,654,552 | A | * | 3/1987 | Fritzsche ............... 310/216.043 |
| 4,894,905 | A |   | 1/1990 | Tanaka et al. |

(Continued)

FOREIGN PATENT DOCUMENTS

CN 1601850 3/2005

(Continued)

OTHER PUBLICATIONS

Russian Office Action dated Jun. 30, 2010.

(Continued)

*Primary Examiner* — Quyen Leung
*Assistant Examiner* — John K Kim
(74) *Attorney, Agent, or Firm* — KED & Associates, LLP

(57) ABSTRACT

A stator of an outer rotor type motor is provided. The stator may include a helical core having stacked layers formed by winding a single metal sheet having a predetermined shape in a helical direction, a base and teeth that protrude from the base. The stator may also include an insulator made of electrical insulation material that surrounds the helical core, recesses formed in the base of the helical core that reduce stress due to the winding of the single metal sheet and disposed under the teeth, and auxiliary recesses formed in a bottom of the recesses.

40 Claims, 6 Drawing Sheets

U.S. PATENT DOCUMENTS

| | | | |
|---|---|---|---|
| 4,914,934 A | | 4/1990 | Fritzsche |
| 5,359,249 A | * | 10/1994 | Tanaka .................. 310/216.069 |
| 6,023,119 A | * | 2/2000 | Asao ...................... 310/216.106 |
| 6,147,431 A | * | 11/2000 | Asao et al. ............. 310/216.004 |
| 6,246,142 B1 | * | 6/2001 | Asao et al. ............. 310/216.136 |
| 7,221,072 B2 | * | 5/2007 | Ahn ........................ 310/216.001 |
| 7,490,489 B2 | * | 2/2009 | Kim et al. ........................ 68/3 R |
| 2003/0020357 A1 | * | 1/2003 | Harada et al. ................. 310/216 |
| 2003/0159272 A1 | * | 8/2003 | Fujita et al. ..................... 29/596 |
| 2005/0073211 A1 | * | 4/2005 | Lee ................................ 310/216 |
| 2005/0127775 A1 | * | 6/2005 | Lee et al. ...................... 310/216 |
| 2005/0189837 A1 | | 9/2005 | Lee |
| 2005/0241346 A1 | * | 11/2005 | Choi ................................ 68/140 |
| 2009/0230812 A1 | * | 9/2009 | Cho et al. ............... 310/216.118 |

FOREIGN PATENT DOCUMENTS

| | | |
|---|---|---|
| EP | 1 529 870 | 5/2005 |
| EP | 1 550 758 | 7/2005 |
| JP | 10-225027 | 8/1998 |
| JP | 2000-166152 | 6/2000 |
| KR | 10-2005-0056679 | 6/2005 |
| KR | 10-2005-0087455 | 8/2005 |
| SU | 1403220 | 6/1988 |
| SU | 1697201 | 7/1991 |
| SU | 1742946 | 6/1992 |
| SU | 1764123 | 9/1992 |
| WO | WO 2004/030185 | 4/2004 |
| WO | WO 2005/081645 | 9/2005 |

OTHER PUBLICATIONS

Korean Office Action dated Dec. 21, 2007.
Russian Office Action dated Mar. 26, 2010.
International Search Report dated Feb. 17, 2009.
Written Opinion of the International Searching Authority dated Feb. 17, 2009.

* cited by examiner

[Fig. 1]
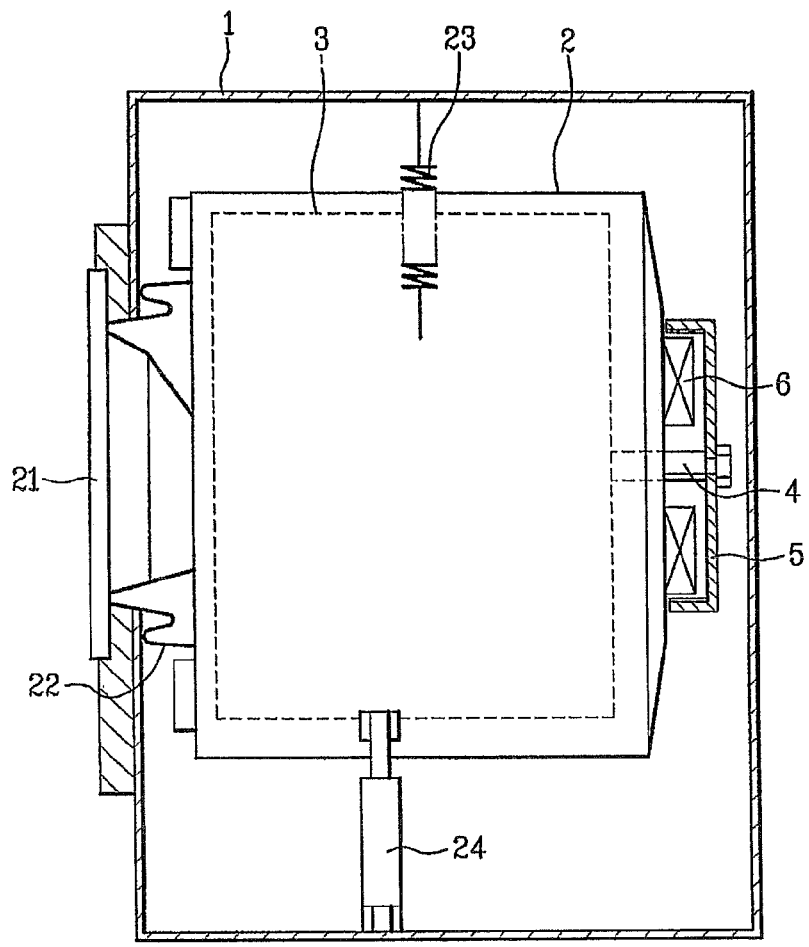
[Fig. 2]
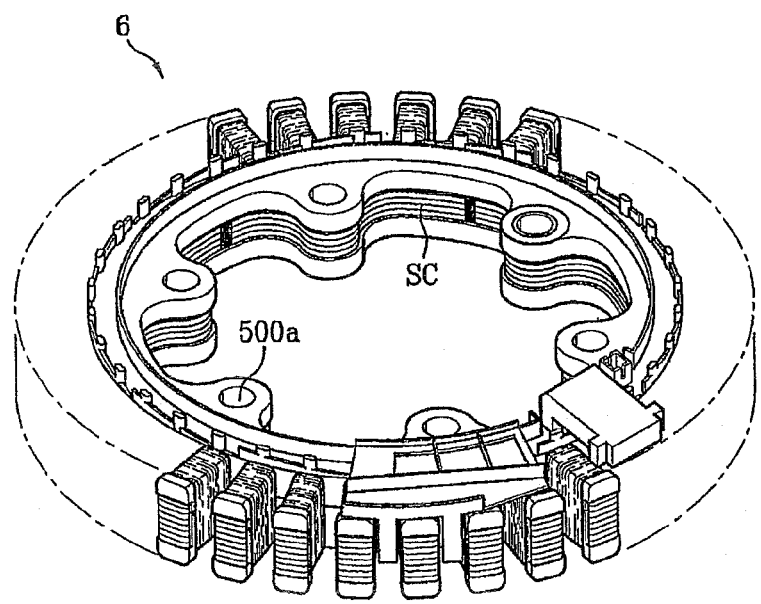

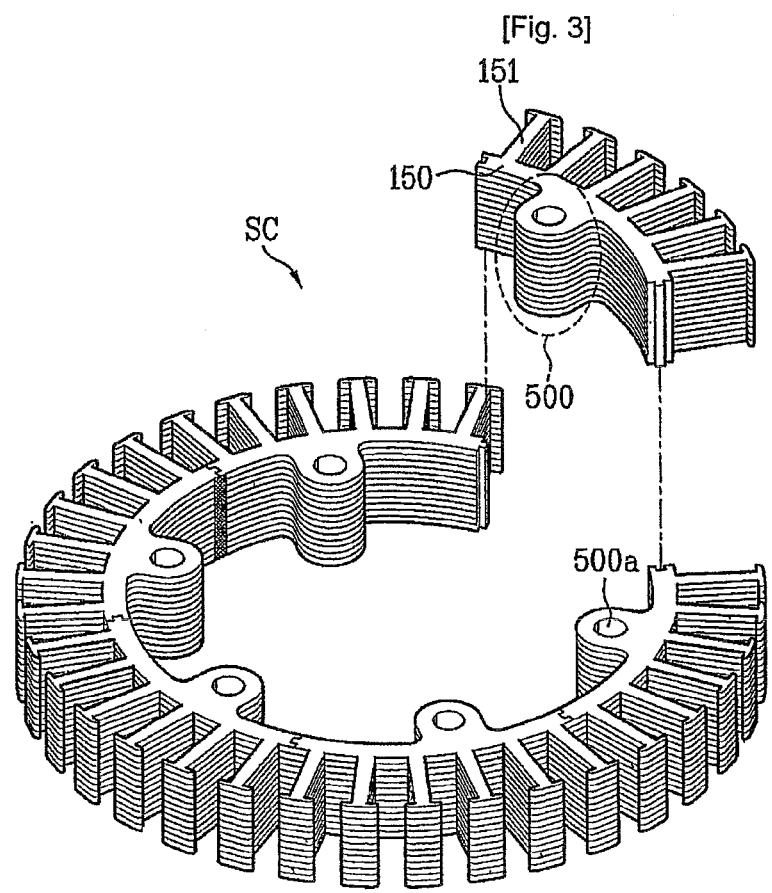
[Fig. 3]
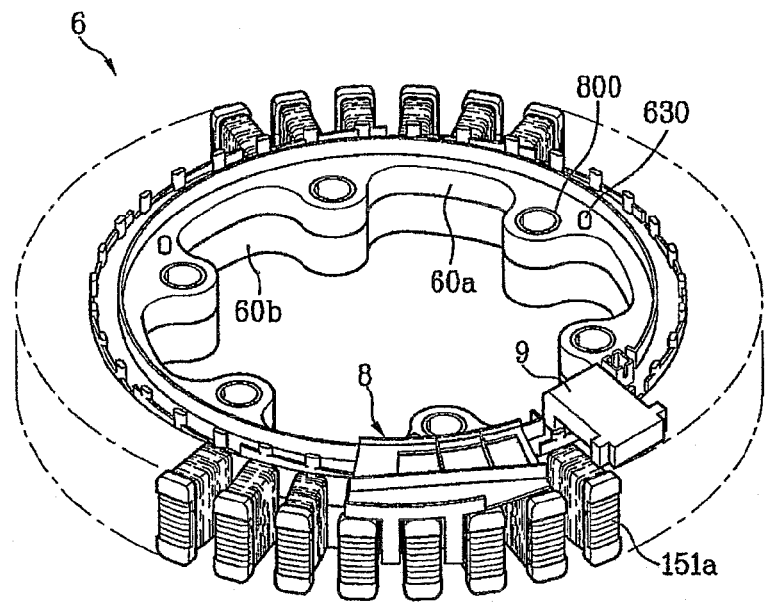
[Fig. 4]

[Fig. 5]
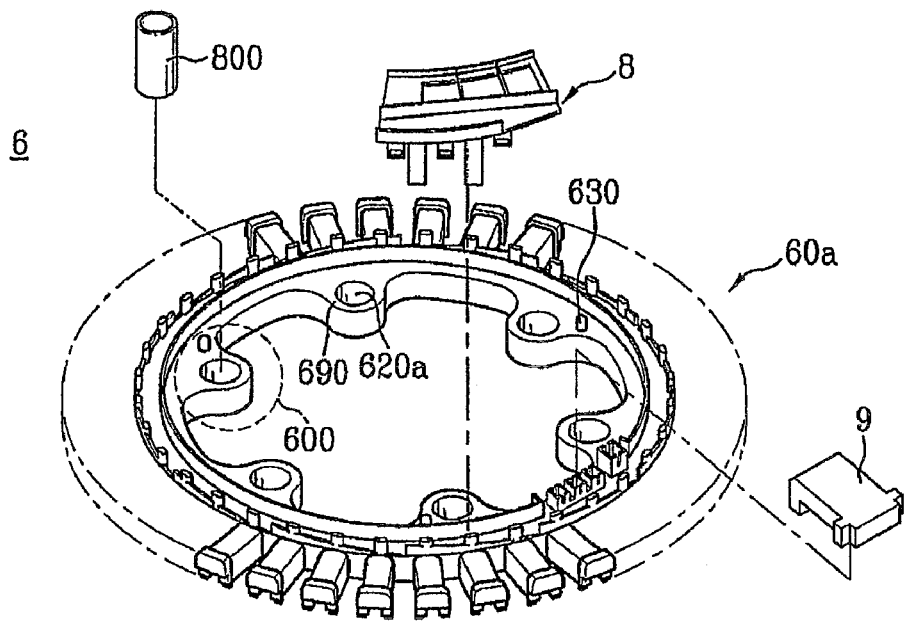
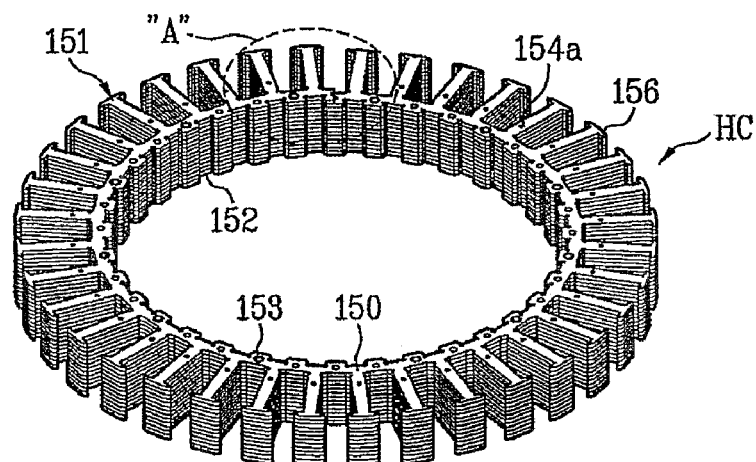
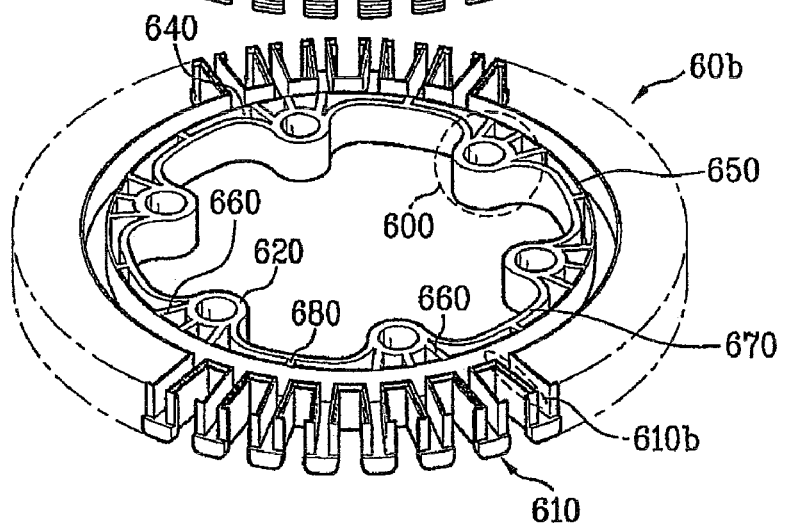

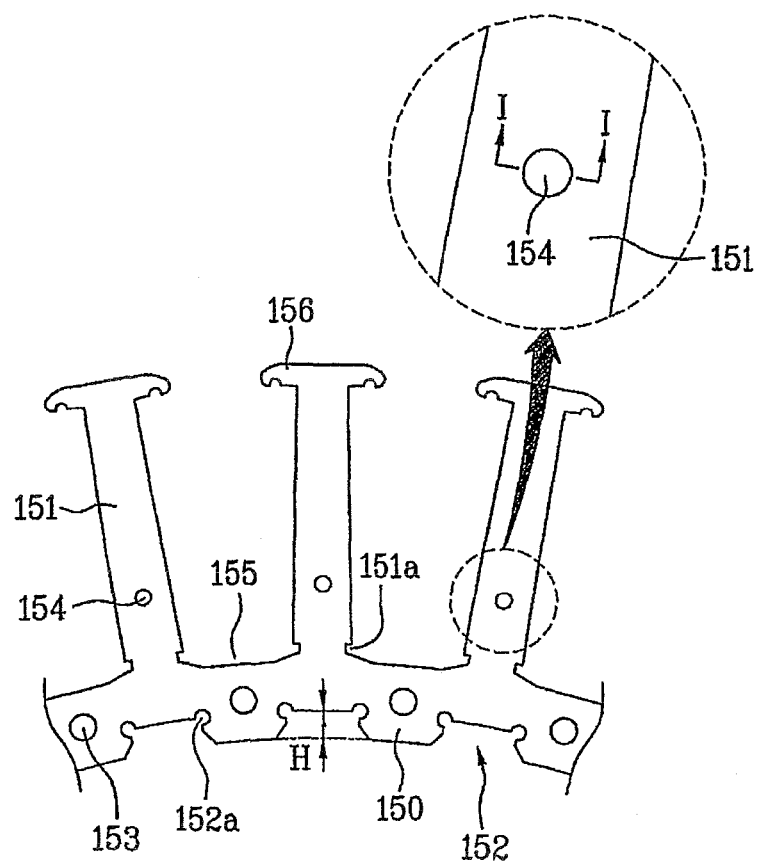
[Fig. 6]
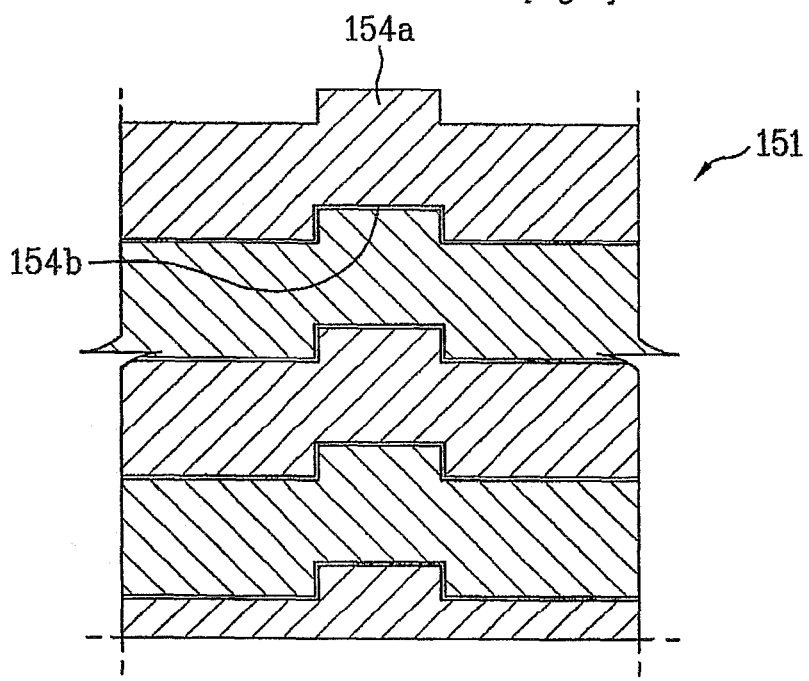
[Fig. 7]

[Fig. 8]
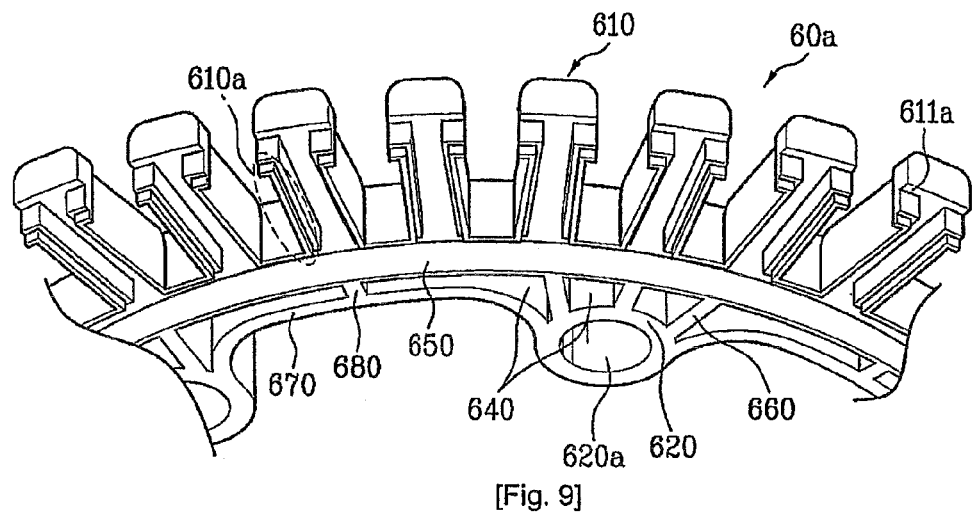
[Fig. 9]
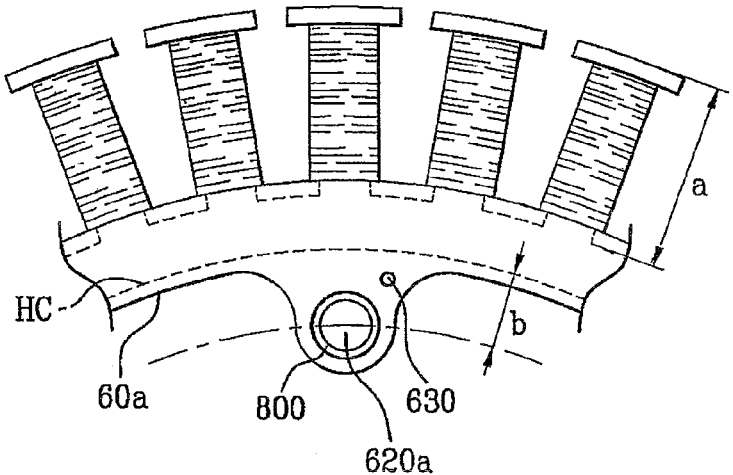
[Fig. 10]
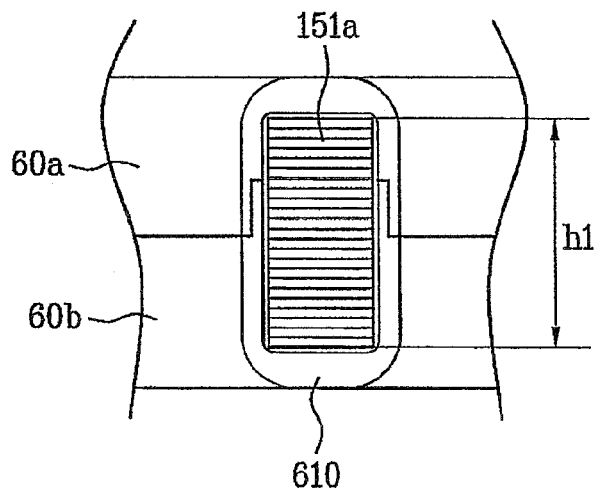

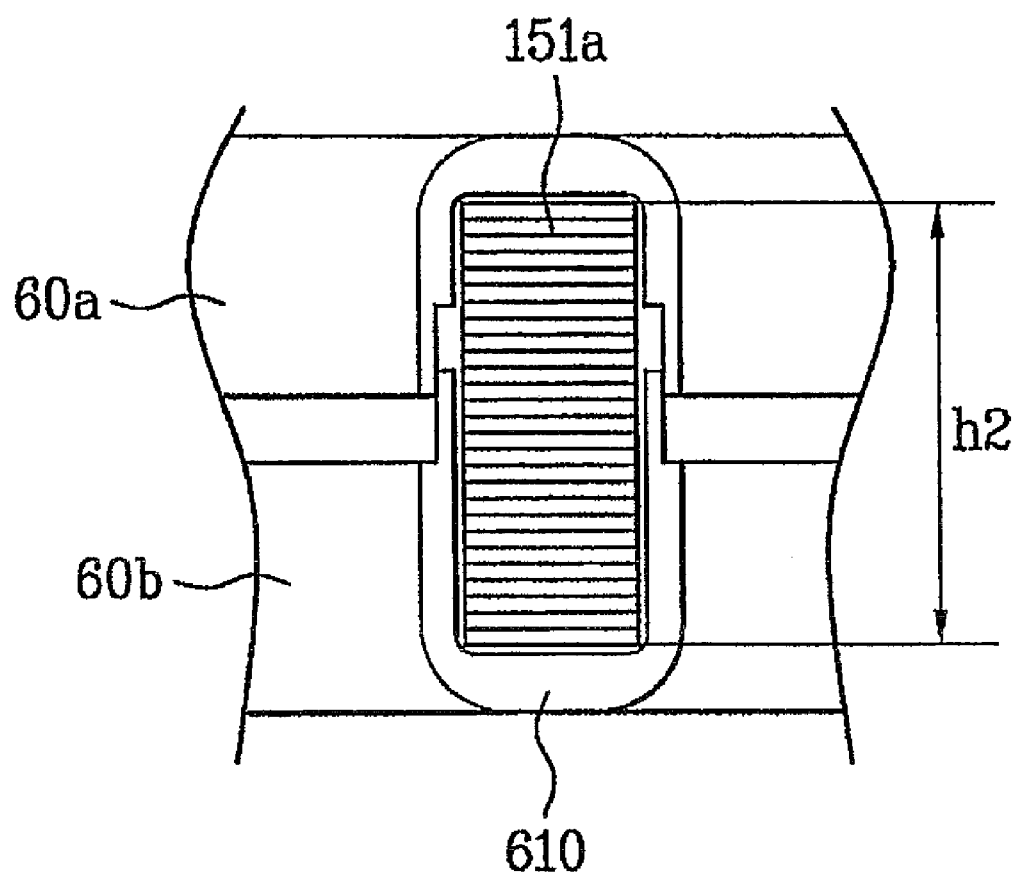

STATOR OF OUTER ROTOR TYPE MOTOR

TECHNICAL FIELD

The invention relates to a clothes washing machine, and more particularly to, a stator of an outer rotor type brushless direct current (BLDC) motor.

BACKGROUND ART

Generally, a drum type washing method is a method of washing laundry using frictional force, generated between a drum rotated by a driving force transmitted from a motor and the laundry when detergent, washing water, and laundry are put into a drum of a clothes washing machine. In the drum type washing method, the laundry is minimally damaged and entangled and an effect of beating and rubbing the laundry can be achieved.

Moreover, according to a drive type, a conventional clothes washing machine is grouped into an indirect-coupled type clothes washing machine in which a driving force of a motor is indirectly transmitted to a drum through a belt wound around a motor pulley and a drum pulley, and a direct-coupled type clothes washing machine in which a rotor of a brushless direct current (BLDC) motor is directly coupled with a drum such that a driving force of the BLDC motor is directly transmitted to the drum.

Here, in the clothes washing machine in which the driving force of a motor is not directly transmitted to the drum but is indirectly transmitted to the drum through the belt wound around the motor pulley and the drum pulley, energy loss is generated during the transmission of the driving force and significant noise is generated during the transmission of the driving force.

Thus, in order to solve the problem of the conventional clothes washing machine, it is recent trend of widely using a direct-coupled drum type clothes washing machine using the BLDC motor.

With reference to FIG. 1, a conventional direct-coupled drum type clothes washing machine will be described in brief as follows.

FIG. 1 is an elevational sectional view illustrating a structure of the conventional drum type clothes washing machine including a tub 2 installed in a cabinet 1 and a drum 3 installed to rotate in the central region of the tub 2.

A motor is installed in the tear side of the tub 2. A stator 6 of the motor is fixed to a rear wall of the tub 2 and a rotor 5 is installed to surround the stator 6 and penetrates the tub 2 to be coupled with a shaft 4 of the drum 3.

Meanwhile, a door 21 is installed at the front side of the cabinet 1 and a gasket 22 is installed between the door 21 and the tub 2.

Moreover, between the upper inner side of the cabinet 1 and the outer circumferential upper side of the tub 2, a hanging spring 23 is installed to support the tub 2. Between the lower inner side of the cabinet 1 and the lower side of the outer circumference of the tub 2, a friction damper 24 is installed to damp vibration of the tub 2 generated during the dehydration.

Meanwhile, FIG. 2 is a perspective view illustrating an external appearance of the stator depicted in FIG. 1, and FIG. 3 is a perspective view illustrating a sectional core employed in the stator depicted in FIG. 2. A conventional stator core is manufactured by the following process. A metal sheet is pressed to make unit cores respectively having teeth 151, a base 150, and protrusion 500 for forming a coupling hole 500a at the opposite side of the teeth 151, the unit cores are stacked to form a core assembly, the core assembly is connected to each other in the circumferential direction so that the stator core, called as a "sectional core", is completed.

The protrusion provides the coupling hole 500a required when the stator 6 is coupled with the rear wall of the tub and resists the fastening force of a bolt.

However, the manufacturing process of the stator 6 using the sectional core is complicated and there are a lot of material losses.

Thus, in order to reduce the material loss and to simplify the manufacturing process, a helical core, in which metal sheets having the teeth 151 and the base 150 are rotated and stacked in helical direction, is useful. However, since blanked metal sheet must be helically bent during the manufacturing of the helical core (HC), the protrusion for coupling the stator with the tub cannot be formed in the core.

This is because, in a case of forming the protrusion 500 in the inner side of the core when manufacturing the helical core, the width of the core where the protrusion is present is too large so that the core cannot be bent.

Thus, there is a demand for new structure of the stator capable of employing the helical core by which the core itself does not perform the same function as the protrusion of the section core but other part performs the function.

For reference, the important reason of guaranteeing sufficient strength of the protrusion having the coupling hole for coupling the stator with the tub is as follows.

In the drum type clothes washing machine for directly rotating the drum using the BLDC motor, a stator is directly installed to a fixing part of the rear side of the tub. However, in a motor of a high volume drum type clothes washing machine having weight of the stator equal to or greater than 1.5 Kg and the dehydration speed of 600 RPM to 2,000 RPM, due to the weight of the stator, vibration during the rotation at high speed, and trembling and deformation of the rotor 5, the coupling part of the stator 6 is damaged.

Particularly, in a drum type clothes washing machine using the BLDC motor of which stator 6 is coupled with the rear wall of the tub 2, since the radial direction of the stator 6 is approximately parallel to the ground, due to vibration generated during the operation of the drum type clothes washing machine, the connection part of the stator 6 with the rear wall of the tub 2 is more seriously damaged.

Thus, it is very important to guarantee sufficient strength of the protrusion having the coupling hole for coupling the stator 6 with the tub.

DISCLOSURE OF INVENTION

Technical Problem

Therefore, the present invention has been made in view of the above problems, and it is an aspect of the present invention to provide an outer rotor type motor of a drum type clothes washing machine having a stator in which less material and less weight are required in manufacturing the same, which is simply manufactured and stably installed to a fixing part such as a tub, a bearing housing, or the like.

It is another aspect of the present invention is to provide a stator having a new structure and suitable for a brushless direct current motor of a drum type clothes washing machine in which less material is required as described above, a stator is stably installed to a fixing part such as a tub, a bearing housing, or the like, like a stator employing a section core, weight of the stator is 1.5 Kg or more and rotational speed varies 0 RPM to 2,000 RPM or more.

It is still another aspect of the present invention to provide a stator in which it is possible to prevent metal sheets forming a helical core from releasing in the counter rotation direction when winding the helical core and to prevent the stacked metal sheets from coming off each other.

It is still another aspect of the present invention to provide a stator in which it is possible to prevent metal sheets forming a helical core from releasing in the counter rotation direction when winding the helical core and to reduce stress of the metal sheets so that the winding is easily carried out.

Technical Solution

In accordance with an aspect of the present invention, the above and other objects can be accomplished by the provision of a stator of an outer rotor type motor comprising a helical core including a plurality of stacked layers formed by winding a single metal sheet having a predetermined shape in a helix, a base, and teeth protruded from the base, an insulator, made of electrical insulation material, to surround the helical core, and recesses configured to reduce stress due to the winding of the metal sheet wherein the recesses are formed in a base of the helical core and are disposed under the teeth.

The insulator includes an upper insulator for surrounding an upper portion of the helical core, and a lower insulator coupled with the upper insulator to surround a lower portion of the helical core. Moreover, the insulator includes a coupling part protruded from an inner circumference of the insulator toward a central portion thereof to fix the stator to a tub.

Preferably, the recesses are positioned on central lines of the teeth, and the recesses are formed in the inner circumference of the base. Moreover, the stator of the present invention further includes auxiliary recesses formed in the recesses.

The stator of the present invention further includes a cutout portion formed on an outer circumference of the base of the helical core in order to reduce stress due to the winding, and recesses formed on root portions of the teeth in order to reduce stress.

Moreover, the stator of the present invention further includes through-holes formed in the base to fasten the plurality of layers to each other with a fastening member, and these through-holes are disposed between two adjacent teeth.

Moreover, the stator of the present invention further includes a coupling mechanism for preventing any two adjacent layers stacked in the helical core from releasing.

ADVANTAGEOUS EFFECTS

According to the present invention, productivity and reliability of the stator can be remarkably increased.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a schematic elevational sectional view illustrating a structure of the conventional drum type clothes washing machine;

FIG. 2 is a perspective view illustrating an external appearance of a conventional stator;

FIG. 3 is a perspective view illustrating a sectional core employed in the stator in FIG. 2;

FIG. 4 is a perspective view illustrating a stator according to a preferred embodiment of the present invention;

FIG. 5 is an exploded perspective view illustrating the stator in FIG. 4;

FIG. 6 is a plan view of a portion "A" in FIG. 5;

FIG. 7 is a sectional view illustrating a helical core taken along the line I-I in FIG. 6;

FIG. 8 is a rear perspective view illustrating a part of an upper insulator of the stator in FIG. 5;

FIG. 9 is a partial plan view illustrating the stator in FIG. 4; and

FIGS. 10 and 11 are views illustrating a common use of the insulator.

BEST MODE FOR CARRYING OUT THE INVENTION

Hereinafter, preferred embodiments of a stator of the present invention capable of implanting the above objects and features of the present invention will be described in detail with reference to FIGS. 4 to 11.

FIG. 4 is a perspective view illustrating a stator according to a preferred embodiment of the present invention, FIG. 5 is an exploded perspective view illustrating the stator in FIG. 4, FIG. 6 is a plan view of a portion "A" in FIG. 5, FIG. 7 is a sectional view illustrating main parts of a helical core taken along the line I-I in FIG. 6, FIG. 8 is a rear perspective view illustrating a part of an upper insulator of the stator in FIG. 5, FIG. 9 is a partial plan view illustrating the stator in FIG. 4, and FIGS. 10 and 11 are reference views illustrating a common use of the insulator.

Referring to FIGS. 4 and 5, a stator 6 of an outer rotor type motor according to the preferred embodiment of the present invention basically includes a helical core and insulators 60a and 60b.

Firstly, the helical core is made of a single metal sheet wound in helical direction. Thus, the helical core has a plurality of layers formed by winding a single metal sheet. Moreover, the metal sheet is wound from the lowermost layer to the uppermost layer. The metal sheet has a predetermined shape allowing the helical core to have a desired profile when the winding of such a metal sheet is completed. More specifically, the metal sheet has a strip-shaped base and teeth protruded from the base so that the resultant helical core has a ring-shaped base 150 and teeth 151 protruded from the base 150. Moreover, the winding-starting point of the helical core and the winding-ending point of the helical core, namely, ends of the metal sheet may be respectively fixed to adjacent predetermined positions of the base 150. The metal sheet could be made of steel.

When winding the metal sheet, stress is generated due to deformation. Thus, in order to reduce the stress, as shown in FIG. 6, recesses 152 are formed in the base 150. Moreover, since the inner circumference of the base 150 is subjected to stress such as a compression stress, stronger than that applied to other portions, the recesses 152 are formed in the inner circumference of the base 150. Meanwhile, since the recesses 152 decrease the sectional area of the base 150, the strength of the helical core may be decreased when a tensile stress or a compression stress is applied. Thus, the recesses 152 are arranged at portions of the base 150 under the teeth 151, the structurally stable portions in the base 150. Preferably, these recesses 152 are defined at an inner circumference of the base 150. In other words, the recesses 152 are positioned on the central lines of the teeth 151.

In addition, auxiliary recesses 152a are formed in the recesses 152 preferably. The auxiliary recesses 152a reduce the stress more effectively and allow the metal sheet to be more easily wound. The auxiliary recesses 152a are formed on the bottom of the recesses 152 to allow easy winding of the metal sheet. Disposing two or more auxiliary recesses 152a symmetrically is more effective for the metal sheet to be wound.

Meanwhile, for batch production and easily storage of the metal sheet which is a raw material of the helical core, standard shapes of the respective portions of the metal sheet are important. Thus, the recesses 152 may have a standardized shape in the present invention. In more detail, the recesses 152 have a maximal depth H at the central portions thereof. Moreover, in order for easy production, preferably, the recesses 152 are symmetrically formed about the central portions and have tapered sidewalls. Consequently, the recesses 152 may be formed in a polygonal shape, for example, as shown in FIG. 6, a trapezoidal shape. In the polygonal shaped recesses 152, the auxiliary recesses 152a, as shown in the drawings, are preferably formed at corners of the recesses 152. Although the recesses have the polygonal shape in this embodiment, the recesses 152 may be a semi-circular shape, an oval shape, or any other shapes for the purpose of the standardization.

Additionally, the outer circumference of the base 150 is subject to a tensile stress due to the winding of the metal sheet. Therefore, preferably, in order to reduce the tensile stress, cut-out portions 155 are formed on the outer circumference of the base 150. The cut-out portions 155 are disposed between two adjacent teeth. Moreover, on the root portions of the teeth 151, recesses 151a may be formed to reduce the stress. The recesses 151a are connected with the cut-out portions 155. Thus, the recesses 151a reduce stress applied to the teeth 151 and reduce stress applied to the outer circumference of the base in association with the cut-out portions 155.

Finally, in the base 150, through-holes 153 are formed to penetrate layers of the helical core. The through-holes 153 are preferably disposed between two adjacent teeth 151 in order to avoid interference with the recesses 152. With the through-holes 153 and fastening members such as rivets inserted into the through-holes 153, a plurality of layers of the helical core can be rigidly fastened to each other.

The metal sheet of the helical core may be unwounded due to vibration transmitted from the tub and the motor. Thus, in order to prevent two adjacent layers within the helical core from being unwound, a coupling mechanism is applied to the helical core. The coupling mechanism can prevent a gap from being generated between the two adjacent layers as well.

Referring to FIGS. 6 and 7, the coupling mechanism includes protrusions 154a, protruded from on the upper surfaces of the teeth of the metal sheet, and recesses 154b formed on the lower surfaces of the teeth of the metal sheet which is configured to engage with the protrusions 154a when the metal sheet is stacked. Alternatively, the protrusions may be formed on the lower surfaces of the teeth of the metal sheet and the recesses may be formed on the upper surfaces of the teeth of the metal sheet. Thus, due to the coupling mechanism, the two adjacent layers of the helical core can be engaged with each other.

As shown in FIGS. 4, 5, and 8, in the stator 6 according to the preferred embodiment of the present invention, the insulators 60a and 60b are made of electrical insulation material and surround the helical core. Specifically, the insulators include an upper insulator 60a, having a shape matching with the profile of the helical core and surrounding the upper portion of the helical core, and a lower insulator 60b, having a shape matching with the profile of the helical core and surrounding the lower portion of the helical core, to be coupled with the upper insulator 60a.

The upper insulator 60a and the lower insulator 60b include coupling parts 600 protruded from the inner circumference of the helical core toward the central portion of the helical core in order to fix the stator 6 to the tub 2. The coupling parts 600 are integrally formed with the insulators 60a and 60b, and the insulators 60a and 60b preferably have three or more coupling parts 600. The coupling parts 600 (See FIG. 5) have coupling holes 620a (See FIG. 5) to fix the stator 6 to the tub 2 with fastening members. The coupling holes 620a are defined by bosses 620 protruded from the inner surface, namely, unexposed surfaces of the coupling parts 600.

At the inner surfaces of the upper insulator 60a and the lower insulator 60b, supporting rib 650 is formed along circumferential direction to support the inner circumference of the helical core. In other words, the supporting rib 650 is formed on the unexposed surfaces of the insulators 60a and 60b which are contact with the upper and lower surfaces of the helical core. In each coupling part 600 of the upper insulator 60a and the lower insulator 60b, at least one reinforcing rib 660 is provided to connect the boss 620 defining the coupling hole 620a, to the supporting rib 650. The reinforcing rib 660 shares fastening force concentrated to the bosses 620, and reinforces strength of the coupling parts 600. Meanwhile, reinforcing ribs 670 are formed to connect the coupling parts 600 of the upper or lower insulators 60a and 60b to each other, and at least one connection rib 680 is formed to connect the reinforcing ribs 670 to the supporting rib 650 supporting the inner circumference of the helical core and to provide a supporting force.

On the sidewalls of the teeth 610 of the upper insulator 60a and the lower insulator 60b, tips 610a and 610b are formed to be engaged with each other during the assembly. If one of the tips 610a and 610b formed on the sidewalls of the teeth 610 are formed to have an "L"-shape, the other of the tips 610a and 610b has a reversed "L"-shape. Further, tips 610a and 610b engaging with each other are formed on end surfaces approximately perpendicular to the sidewalls of the respective teeth 610 of the upper insulator 60a and the lower insulator 60b. On ends of the upper insulator 60a and the lower insulator 60b, seating surfaces 611a are formed to allow core shoes 156 of the helical core to be seated thereon.

Around the coupling holes 620a formed in the coupling parts 600 of the upper insulator 60a, positioning protrusions 630 are formed to be inserted into positioning grooves or positioning holes (not shown) that are formed in the tub 2.

Cylindrical sleeves 800 installed in the coupling holes 620a are made in the form of a spring pin, having elasticity due to a cutting portion, or of a hollow pin, forcedly inserted into the coupling holes 620a. These sleeves 800 serve as a bushing.

Referring to FIG. 9, the stator 6 according to the preferred embodiment of the present invention includes coupling parts 600 that are integrally formed with the upper insulator 60a and the lower insulator 60b and are protruded inwardly from the inner circumference thereof in the radial direction. When a length of teeth 151 from the helical core, more precisely, from the outer circumference of the base 150 is set to "a" and a distance from the helical core, namely, from the inner circumference of the base 150 to the centers of the coupling holes formed in the coupling parts 600 is set to "b" the coupling parts satisfy the condition a≧b.

A reference numeral 8 in FIG. 5 is assigned to a hall sensor assembly for controlling a motor, and reference numeral 9 is assigned to a tap housing assembly for power connection to supply electric power to the stator.

Operation of the stator according to the preferred embodiment of the present invention will be described as follows.

Firstly, since the helical core in which a metal sheet having the teeth and the base is wound and stacked in the helical direction is used in the present invention as a core, mating and welding of sectional cores are eliminated differently from a case of using the sectional cores so that the manufacturing is simplified. Moreover, differently from the case of the sectional cores, in the helical core, there is no need to form protrusions so that material loss can be reduced. As a whole, the manufacturing process of the stator according to the present invention is simple and material loss can be reduced.

Further, the helical core is provided with coupling mechanism having the protrusions 154a and the recesses 154b to prevent the metal sheet from releasing (spring back phenomenon) and gaps from being generated between the stacked layers so that the manufacturing of the core is conveniently and precisely carried out.

Still further, since the base 150 of the helical core has the recesses 152, the stress of the base 150 generated during the winding of the metal sheet is decreased. Therefore, the metal sheet is prevented from releasing (spring back) and the winding of the metal for forming the helical core is easily carried out.

Additionally, the stator 6 according to the preferred embodiment of the present invention has sufficient strength against the fastening force of bolts by improving the structure of the upper and lower insulators 60a and 60b without the protrusions formed in the core itself for resisting the fastening force when fixing the stator 6 to the tub 2. In other words, in the present invention, structures serving as the protrusions of the sectional core are formed in the coupling parts 600 of the upper and lower insulators 60a and 60b so that a stator 6 to which the helical core is applicable is provided.

Furthermore, spaces between the respective ribs 650, 660, 670 and 680 provided on the unexposed surfaces of the coupling parts 600 perform the buffering and damping against vibration generated when the motor is driven, in order to improve the mechanical reliability of the stator 6, and the spaces 640 contribute to reduction of material of the insulators.

Meanwhile, the supporting rib 650 which is formed in the circumferential direction on the unexposed surfaces contacting the upper and lower surfaces of the helical core of the upper insulator 60a and the lower insulator 60b, supports the inner circumference of the stator core 150. Moreover, the reinforcing ribs 660 for connecting the bosses 620, which are formed in the coupling parts 600 of the upper insulator 60a and the lower insulator 60b to form the coupling holes 620a, to the supporting ribs 650 share the fastening force concentrated on the bosses 620 and reinforce the strength of the coupling parts 600.

Thus, the stator 6 according to the preferred embodiment of the present invention effectively prevents the fastened parts of the stator 6 from damage due to vibration, and trembling and deformation of the rotor 5 during the rotation at high speed in the high capacity drum type washing machine having weight of the stator equal to or greater than 1.5 Kg and the dehydration speed of 600 RPM to 2,000 RPM.

The positioning protrusions 630 formed around the coupling holes 620a of the coupling parts 600 are inserted into the positioning grooves (not shown) of the tub 2 to help easy coupling of the stator 6.

Thus, the stator 6 according to the preferred embodiment of the present invention is easily assembled to the tub due to the positioning protrusions, so that the maintenance is easily carried out. Alternatively, the positioning protrusions 630 may be formed in the tub 2 and the positioning grooves may be formed in the coupling parts 600.

Meanwhile, FIGS. 10 and 11 are reference views illustrating a common use of the insulator. The upper and lower insulators 60a and 60b can be applied even when height of the stacked helical core is changed.

The stacking height h1 of the helical core as shown in FIG. 10 is a height allowing the tips 610a and 610b of the upper and lower insulators 60a and 60b to be completely coupled with each other. On the other hand, FIG. 11 illustrates a case when the stacking height h2 is higher than h1 so that the tips 610a and 610b (See FIGS. 5 and 8) of the upper and lower insulators 60a and 60b are not completely coupled with each other. However, since the helical core is insulated even in the case shown in FIG. 11, the insulators 60a and 60b can be applied to the stator 6. Thus, since the separate type upper and lower insulators according to the preferred embodiment of the present invention can be commonly used regardless of the stacking height of the core within a predetermined range, workability in the assembly line can be improved.

Although embodiments have been described with respect to a clothes washing machine, those embodiments can be applied to stators of other home appliances.

It will be apparent to those skilled in the art that various modifications and variations can be made in the present invention without departing from the spirit or scope of the inventions. Thus, it is intended that the disclosure of the present invention covers any modifications and variations provided they come within the scope of the appended claims and their equivalents.

INDUSTRIAL APPLICABILITY

The effect of the stator of the present invention will be described in detail as follows.

Firstly, material required in manufacturing the stator of the BLDC motor of the drum type clothes washing machine and weight of the stator are reduced, the manufacturing process is simplified, and the stator is stably installed to the tub.

Particularly, according to the present invention, materials for the stator core and the insulators are reduced and the stator can be stably installed to the tub like a case of the sectional core. Thus, the stator according to the present invention is suitable for the BLDC motor of a drum type clothes washing machine having a stator with weight of 1.5 Kg or more and a rotational speed varied 0 to 2,000 RPM or more.

The stator of the present invention is easily coupled to the tub on the assembly line so that the maintenance is easily carried out.

The helical core capable of preventing the metal sheet from releasing is employed so that the stator is easily manufactured. Moreover, strength of the coupling parts of the stator is increased so that noise and vibration are reduced, mechanical reliability is improved, and life span is prolonged.

The invention claimed is:

1. A stator of an outer rotor type motor, comprising:
a helical core including a plurality of stacked layers formed by winding a single metal sheet having a predetermined shape in a helix, the helical core having a base and a plurality of teeth that protrude from the base;
an insulator made of electrical insulation material that surrounds the helical core;
a plurality of recesses configured to reduce stress due to the winding of the metal sheet, the plurality of recesses formed in a base of the helical core and disposed under the plurality of teeth; and a plurality of auxiliary recesses formed in a bottom of the plurality of recesses.

2. The stator of an outer rotor type motor according to claim 1, wherein the metal sheet is wound starting from a lowermost layer to an uppermost layer.

3. The stator of an outer rotor type motor according to claim 1, wherein the metal sheet comprises a strip-shaped base and the plurality of teeth protruded from the base.

4. The stator of an outer rotor type motor according to claim 1, wherein the insulator has a shape matching with an outer profile of the helical core.

5. The stator of an outer rotor type motor according to claim 1, wherein the insulator comprises:
an upper insulator that surrounds an upper portion of the helical core; and
a lower insulator coupled with the upper insulator and surrounding a lower portion of the helical core.

6. The stator of an outer rotor type motor according to claim 1, wherein the insulator is configured to install the helical core to a tub.

7. The stator of an outer rotor type motor according to claim 1, wherein the insulator comprises a coupling part that protrudes from an inner circumference of the insulator toward a central portion thereof so as to fix the stator to a tub.

8. The stator of an outer rotor type motor according to claim 7, wherein the insulator comprises three or more coupling parts.

9. The stator of an outer rotor type motor according to claim 7, wherein the coupling part comprises a coupling hole that fixes the stator to the tub by using a fastening member.

10. The stator of an outer rotor type motor according to claim 9, wherein the coupling hole is defined by a boss that extends from an inner surface of the coupling part.

11. The stator of an outer rotor type motor according to claim 1, wherein the insulator comprises a supporting rib that extends from an inner surface of the insulator to support an inner circumference of the helical core.

12. The stator of an outer rotor type motor according to claim 11, wherein the insulator comprises a reinforcing rib that connects a boss and the supporting rib in order to reinforce strength of a coupling part.

13. The stator of an outer rotor type motor according to claim 5, wherein the upper insulator and the lower insulator comprise a plurality of tips formed in sidewalls of a plurality of teeth in the upper and lower insulators and engaged with each other.

14. The stator of an outer rotor type motor according to claim 5, wherein the upper insulator and the lower insulator comprise a plurality of tips formed at ends of a plurality of teeth in the upper and lower insulators and engaged with each other.

15. The stator of an outer rotor type motor according to claim 5, wherein the upper insulator and the lower insulator comprise a plurality of seating surfaces formed on ends of a plurality of teeth in the upper and lower insulators to seat a plurality of core shoes of the helical core thereon.

16. The stator of an outer rotor type motor according to claim 1, wherein the insulator comprises a positioning protrusion inserted into a positioning hole that is formed in a tub.

17. The stator of an outer rotor type motor according to claim 9, further comprising a cylindrical sleeve installed in the coupling hole.

18. The stator of an outer rotor type motor according to claim 17, wherein the cylindrical sleeve comprises a spring pin having elasticity due to a cutting portion formed along a longitudinal direction of the cylindrical sleeve.

19. The stator of an outer rotor type motor according to claim 17, wherein the cylindrical sleeve comprises a hollow pin forcedly inserted into the coupling hole.

20. The stator of an outer rotor type motor according to claim 1, wherein ends of the metal sheet are welded to adjacent layers of the helical core, respectively.

21. The stator of an outer rotor type motor according to claim 9, wherein when a length of the teeth from an outer circumference of the base is set to "a" and a distance from an inner circumference of the base to a center of the coupling hole formed in the coupling part is set to "b", "a" is equal to or greater than "b" (a>b).

22. The stator of an outer rotor type motor according to claim 1, wherein the plurality of recesses is positioned on a central line of the plurality of teeth.

23. The stator of an outer rotor type motor according to claim 1, the plurality of recesses is formed at an inner circumference of the base.

24. The stator of an outer rotor type motor according to claim 1, wherein the plurality of recesses comprises at least two auxiliary recesses symmetrically disposed to each other.

25. The stator of an outer rotor type motor according to claim 1, wherein the plurality of recesses has a maximum depth at a central portion thereof.

26. The stator of an outer rotor type motor according to claim 1, wherein the plurality of recesses is symmetrical about a central portion thereof.

27. The stator of an outer rotor type motor according to claim 1, wherein the plurality of recesses has tapered side walls.

28. The stator of an outer rotor type motor according to claim 1, wherein the plurality of recesses has a polygonal shape.

29. The stator of an outer rotor type motor according to claim 28, wherein the plurality of recesses has a trapezoidal shape.

30. The stator of an outer rotor type motor according to claim 28, wherein each of the plurality of recesses comprises at least one auxiliary recess formed at a corner thereof.

31. The stator of an outer rotor type motor according to claim 1, further comprising a cut-out portion formed on an outer circumference of the base of the helical core in order to reduce stress due to the winding.

32. The stator of an outer rotor type motor according to claim 31, wherein the cut-out portion is disposed between two adjacent teeth of the plurality of teeth.

33. The stator of an outer rotor type motor according to claim 1, further comprising a plurality of recesses formed on a root portion of the plurality of teeth in order to reduce stress.

34. The stator of an outer rotor type motor according to claim 1, further comprising a plurality of through-holes formed in the base to fasten the plurality of stacked layers to each other with a fastening member.

35. The stator of an outer rotor type motor according to claim 34, wherein the plurality of through-holes is disposed between two adjacent teeth of the plurality of teeth.

36. The stator of an outer rotor type motor according to claim 1, further comprising a coupling device that prevents any two adjacent layers of the plurality of stacked layers stacked in the helical core from releasing.

37. The stator of an outer rotor type motor according to claim 36, wherein the coupling device prevents a gap from being generated between any two layers of the plurality of stacked layers.

38. The stator of an outer rotor type motor according to claim 36, wherein the coupling device allows two adjacent layers of the plurality of stacked layers of the helical core to engage with each other.

39. The stator of an outer rotor type motor according to claim 36, wherein the coupling device comprises:

a plurality of protrusions provided in the metal sheet; and a plurality of recesses provided in the metal sheet that engages with the plurality of protrusions when winding the metal sheet.

40. The stator of an outer rotor type motor according to claim 36, wherein the coupling device is formed in the plurality of teeth of the helical core.

* * * * *